(No Model.)

F. T. WILLIAMS.
SEED PLANTER.

No. 312,689. Patented Feb. 24, 1885.

Attest;
N. E. Thomas
W. H. Harris

Inventor;
Frederic T Williams
Per M Harris
Atty

UNITED STATES PATENT OFFICE.

FREDERIC T. WILLIAMS, OF JAMESTOWN, NEW YORK.

SEED-PLANTER.

SPECIFICATION forming part of Letters Patent No. 312,689, dated February 24, 1885.

Application filed May 8, 1884. (No model.)

*To all whom it may concern:*

Be it known that I, FREDERIC T. WILLIAMS, a citizen of the United States, residing at Jamestown, in the county of Chautauqua and State of New York, have invented certain new and useful Improvements in Seed-Planters; and I do hereby declare the following to be a full, clear, and exact description of the invention, such as will enable others skilled in the art to which it appertains to make and use the same.

The object of my invention is to so improve the feed-slide of seed-planters that any kind of grain may be dropped more uniformly than by those heretofore in use, and to provide for contracting and enlarging the feed-aperture, so that very small seed can be dropped or any desired amount of large seed or fertilizer.

The improvement consists in arranging two or more gages within a feed-slide for planters in such a manner that the aperture through which the seed falls may be increased or diminished, as will be more fully understood by the following specification and accompanying drawings, in which—

Figure 1:
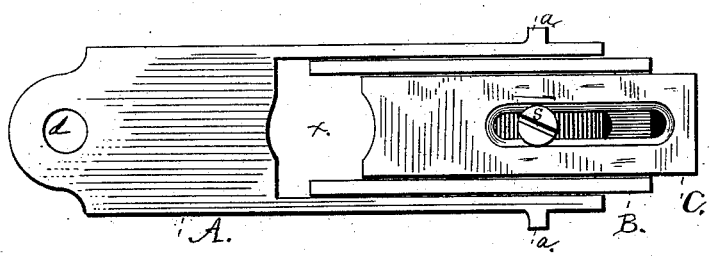
Figure 2:
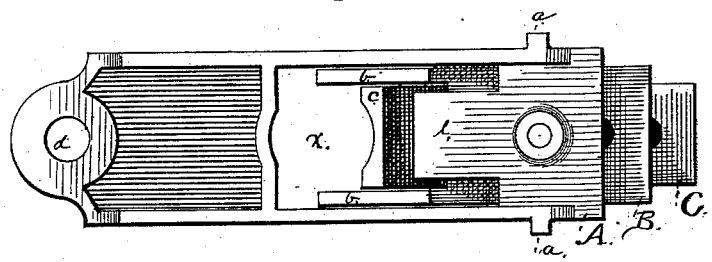
Figure 2:
Figure 3:
Figure 3:

Figure 1 is a top view of feed-slide having my invention. Fig. 2 is a bottom view of same. Fig. 3 shows sectional views of the parts A B C.

In seed-planters it is very desirable to drop the great variety of seed to be planted as uniformly as possible, and feed-slides having openings of equal size each way are found to drop more evenly than those of unequal dimensions; so many parties use a number of slides for each planter, each having a different size hole or feed-cup; but this is not only expensive and complicated, but the desired size for certain grains and the quantity to suit the tastes of the parties using is difficult to get. These troubles are all practically overcome by my improvement.

A in the drawings, Figs. 1 and 2, represents my improved seed-slide, having sliding gages B C. The drawings show all parts full size, just as I use them, Fig. 3 showing depth of same. This slide is used in the seed-box of a hand-planter, and has a hole, d, at one end, through which a vibrating arm runs to move the slide back and forth through the seed-box. It has an opening, x, through its middle and lugs or stops a a near the other end, to prevent the slide from moving too far, and is strengthened at this end by the bridge e, that connects the sides. This bridge is near the bottom of the slide, and has a screw-hole, so the screw S will hold the movable gages B C at any desired place. The top gage, C, is cast and has a projection, c, next the opening x, that is full depth of the slide A. The middle slide, B, has side projections, b b, that drop through the opening x to the bottom of the slide, as shown in Fig. 2. The slide A, passing into the seed-box at its bottom x, is then made a seed-cup to be filled with the desired quantity and drawn out to let fall through an opening to the blades of the planter.

It will be observed that when the gages B C are closed the circular part of the upper gage, C, and the main slide will leave a small opening. This is for very small seed, like cabbage or turnip, &c. For common corn the upper gage, C, is drawn to feed the desired amount, and when large corn in quantities or fertilizer is used both gages can be drawn to give the desired amount. It will also be observed that when corn is dropped the breadth and length of opening is equal, or nearly so, and also when both gages are drawn for fertilizer the relative dimensions are retained. More gages working within each other could be used on the same slide.

I claim—

1. In seed-planters, a seed-slide having two or more adjustable gages within the main slide, and one within another, so the opening or aperture through which the seed passes may be increased or diminished in breadth as well as length, substantially as shown, and for the purpose set forth.

2. In seed-planters, a seed-slide having two or more adjustable gages within the main slide, said gages being provided with projections extending to the bottom of the slide and forming a portion of sides of the seed-cup, substantially as shown, and for the purpose set forth.

In testimony whereof I affix my signature in presence of two witnesses.

FREDERIC T. WILLIAMS.

Witnesses:
MILO HARRIS,
N. E. THOMAS.